(12) United States Patent
Horiguchi

(10) Patent No.: US 12,732,581 B2
(45) Date of Patent: Sep. 8, 2026

(54) IMAGE READING APPARATUS

(71) Applicant: KYOCERA Document Solutions Inc., Osaka (JP)

(72) Inventor: Yasuyuki Horiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 310 days.

(21) Appl. No.: 18/645,300

(22) Filed: Apr. 24, 2024

(65) Prior Publication Data

US 2024/0364829 A1 Oct. 31, 2024

(30) Foreign Application Priority Data

Apr. 25, 2023 (JP) ................................ 2023-071320

(51) Int. Cl.

| | |
|---|---|
| ***G06F 15/00*** | (2006.01) |
| ***H04N 1/00*** | (2006.01) |
| ***H04N 1/053*** | (2006.01) |
| ***H04N 1/10*** | (2006.01) |
| ***H04N 1/12*** | (2006.01) |
| ***H04N 1/56*** | (2006.01) |

(52) U.S. Cl.

CPC ......... *H04N 1/053* (2013.01); *H04N 1/00018* (2013.01); *H04N 1/1061* (2013.01); *H04N 1/1215* (2013.01); *H04N 1/1235* (2013.01); *H04N 1/56* (2013.01); *H04N 2201/0081* (2013.01)

(58) Field of Classification Search

USPC ........................................................ 358/1.15

See application file for complete search history.

(56) References Cited

U.S. PATENT DOCUMENTS

| | | | | |
|---|---|---|---|---|
| 2018/0270385 | A1* | 9/2018 | Zheng ................ | H04N 1/00997 |
| 2019/0124226 | A1* | 4/2019 | Fujii .................. | H04N 1/00702 |
| 2021/0051241 | A1* | 2/2021 | Kim ..................... | H04N 1/4076 |
| 2022/0086300 | A1* | 3/2022 | Horiguchi .......... | H04N 1/00748 |

FOREIGN PATENT DOCUMENTS

| | | |
|---|---|---|
| JP | 2001005119 A | 1/2001 |

* cited by examiner

*Primary Examiner* — Mark R Milia

(74) *Attorney, Agent, or Firm* — Alleman Hall LLP

(57) ABSTRACT

A first reference portion has a lower surface of a first color. A second reference portion is adjacent to the first reference portion in a first direction and has a lower surface of a second color. A data processing portion executes a color determination process of determining whether one or more reference pixel data of a reference area in line image data is data of the first color or the second color. A control device sequentially selects a plurality of drive operations from a plurality of trial drive operations and causes the unit drive device to execute the plurality of drive operations, thereby positioning a scanning unit at a home position. When causing the unit drive device to execute the plurality of drive operations, the control device outputs, to the unit drive device, a speed command signal of a different level according to a moving distance of the scanning unit.

7 Claims, 8 Drawing Sheets

IMAGE READING APPARATUS

INCORPORATION BY REFERENCE

This application is based upon and claims the benefit of priority from the corresponding Japanese Patent Application No. 2023-071320 filed on Apr. 25, 2023, the entire contents of which are incorporated herein by reference.

BACKGROUND

The present disclosure relates to an image reading apparatus having a function of positioning a scanning unit at a home position.

The image reading apparatus may have a function of executing a stationary document sheet reading process. The stationary document sheet reading process is a process of reading an image of a document sheet placed on a platen glass. The stationary document sheet reading process is also referred to as a flatbed image reading process.

In the stationary document sheet reading process, a unit drive device moves a scanning unit including a light emitting portion and a light guiding member formed along a main scanning direction from a predetermined home position toward an area below the platen glass.

The image reading apparatus further includes an image sensor, an analog front end (AFE), and a data processing portion. The image sensor receives light guided by the light guiding member and outputs a line image signal representing the amount of received light. The AFE converts the line image signal into line image data including a plurality of digital pixel data. The data processing portion processes the line image data.

It is noted that the scanning unit may include a contact image sensor unit. The contact image sensor unit includes the light emitting portion, the light guiding member, which is a condenser lens, and a CMOS type image sensor.

The home position is a position displaced in a sub-scanning direction with respect to the area below the platen glass. By the time the scanning unit moves from the home position to the area below the platen glass, the moving speed of the scanning unit is stabilized.

Therefore, the unit drive device needs to position the scanning unit at the home position before the stationary document sheet reading process is executed.

For example, it is known that a mark representing the home position is formed on a reference plate for shading correction disposed next to the platen glass. In this case, the data processing portion detects that the scanning unit has reached the home position by detecting the mark from the line image data.

SUMMARY

An image reading apparatus according to one aspect of the present disclosure includes a platen plate portion, a scanning unit, a control device, a unit drive device, a data processing portion, a first reference portion, and a second reference portion. The platen glass portion is a transparent plate-shaped portion on which a document sheet is placed. The scanning unit includes a light emitting portion and a light guiding portion each disposed along a main scanning direction that intersects a first direction, and is movable in the first direction and a second direction opposite to the first direction in a movable area including an area below the platen plate portion. The main image sensor receives light guided by the light guiding portion and outputs a line image signal representing the amount of received light. The control device outputs a direction command signal indicating a moving direction of the scanning unit and a speed command signal indicating a moving speed of the scanning unit. The unit drive device moves the scanning unit in the movable area in a direction according to the direction command signal at a speed according to the speed command signal. The data processing portion processes line image data including a plurality of pixel data corresponding to the line image signal output by the main image sensor. The first reference portion is disposed along a side edge forming one end of the platen plate portion in the main scanning direction and has a lower surface of a first color. The second reference portion is disposed adjacent to the first reference portion in the first direction and has a lower surface of a second color different from the first color. The data processing portion executes a color determination process of determining whether one or more reference pixel data of a reference area corresponding to the first reference portion or the second reference portion in the line image data is data of the first color or the second color. The control device positions the scanning unit at a home position on the first direction side with respect to the platen plate portion by sequentially selecting a plurality of drive operations from a plurality of trial drive operations each having a different direction or a distance for moving the scanning unit and causing the unit drive device to execute the plurality of drive operations. When causing the unit drive device to execute the plurality of drive operations, the control device outputs, to the unit drive device, the speed command signal of a different level depending on a moving distance of the scanning unit.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments will be described with reference to the drawings. It is noted that the following embodiments are examples of embodying the present disclosure and do not limit the technical scope of the present disclosure.

First Embodiment

An image reading apparatus 1 according to a first embodiment executes an image reading process of reading an image of a document sheet 9. For example, the image reading apparatus 1 may be configured as a part of an imaging processing apparatus such as a copier, a facsimile machine, or a multifunction peripheral.

In the following description, an image read from the document sheet 9 by the image reading process of the image reading apparatus 1 will be referred to as a read image.

[Configuration of Image Reading Apparatus 1]

Figure 1:
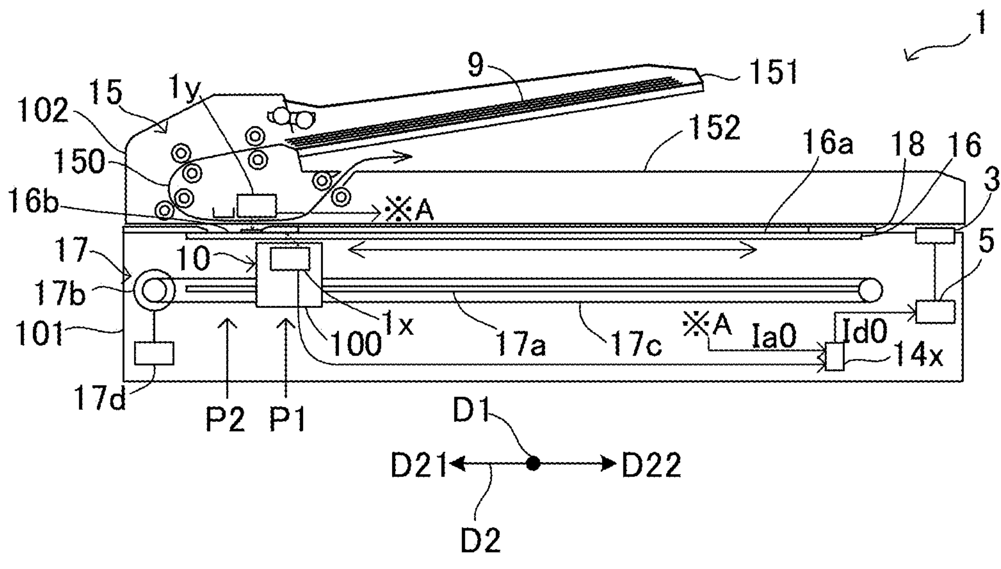
FIG. 1 is a configuration diagram of an image reading apparatus according to a first embodiment.

In the present embodiment, the image reading apparatus 1 includes a main body 101, a document sheet cover 102, a scanning unit 10, an analog front end (AFE) 14*x*, a document sheet conveying device 15, a platen glass portion 16*a*, a contact glass portion 16*b*, and a unit drive device 17 (see FIG. 1).

The image reading apparatus 1 further includes a user interface device 3 and a control device 5.

The longitudinal direction of the scanning unit 10 is a main scanning direction D1. The scanning unit 10 includes a first contact image sensor (CIS) unit 1*x* and a carriage 100 that supports the first CIS unit 1*x*.

In FIG. 1, the depth direction in the drawing is the main scanning direction D1, and the left-right direction in the drawing is a sub-scanning direction D2. The sub-scanning direction D2 is a direction that intersects the main scanning direction D1. In the present embodiment, the sub-scanning direction D2 is a direction orthogonal to the main scanning direction D1.

Figure 5:
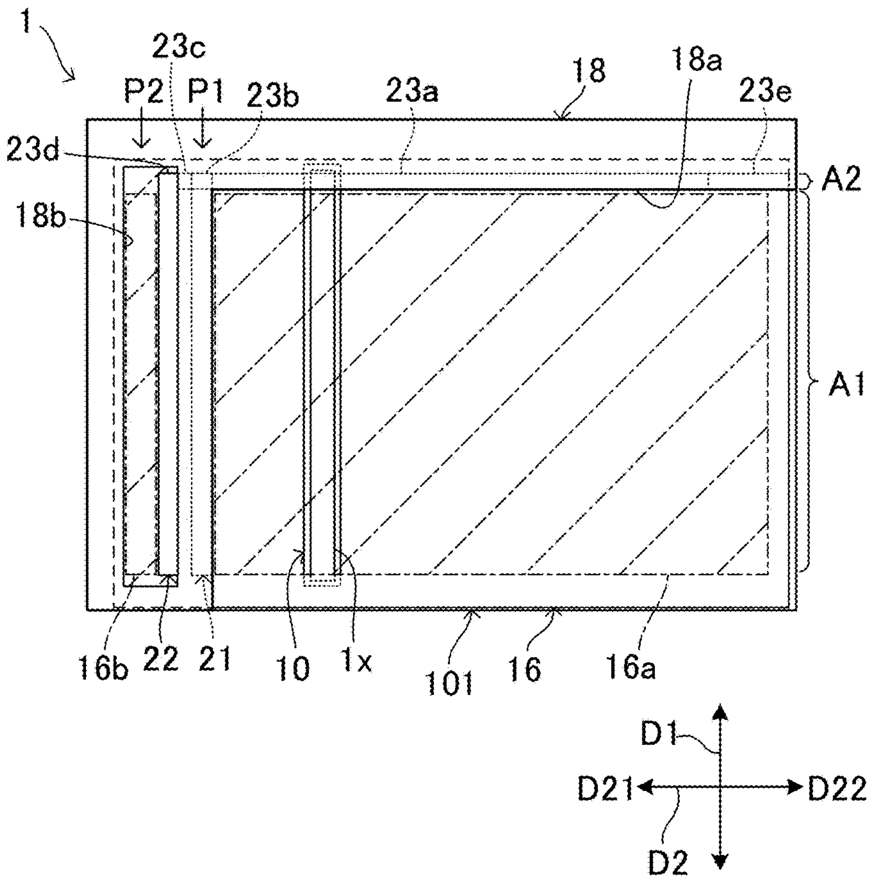
FIG. 5 is a top view of a main body of the image reading apparatus according to the first embodiment.
Figure 6:
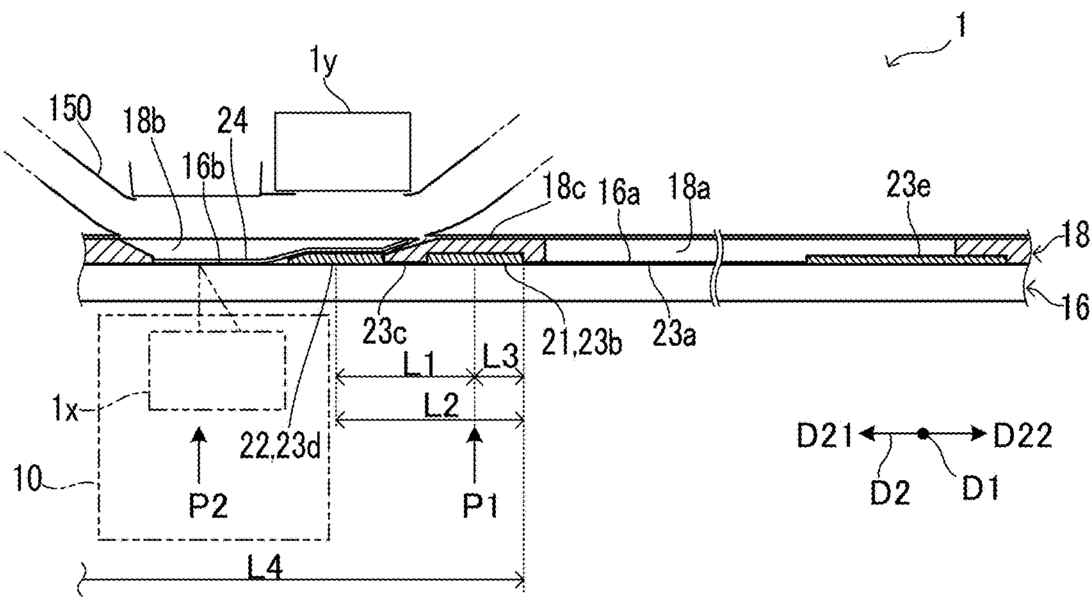
FIG. 6 is a cross-sectional view of an upper portion of the main body of the image reading apparatus according to the first embodiment.

In FIG. 1, FIG. 5, and FIG. 6, a first direction D21 is one direction along the sub-scanning direction D2, and a second direction D22 is the other direction along the sub-scanning direction D2. That is, the second direction D22 is opposite to the first direction D21.

The main body 101 is a housing that houses the scanning unit 10 and the unit drive device 17. The platen glass portion 16*a* and the contact glass portion 16*b* constitute a part of the upper surface of the main body 101.

The platen glass portion 16*a* and the contact glass portion 16*b* are transparent plates. The platen glass portion 16*a* is a portion on which the document sheet 9 is placed. The platen glass portion 16*a* is an example of the platen plate portion.

The contact glass portion 16*b* is disposed on the first direction D21 side with respect to the platen glass portion 16*a*. The contact glass portion 16*b* is an example of the contact plate portion.

In the present embodiment, one transparent glass plate 16 includes the platen glass portion 16*a* and the contact glass portion 16*b* (see FIG. 1, FIG. 5, and FIG. 6). The main body 101 includes a glass cover member 18 disposed to overlap the upper surface of the glass plate 16. The glass cover member 18 is a synthetic resin member.

A first opening 18*a* and a second opening 18*b* are formed in the glass cover member 18 (see FIG. 5 and FIG. 6). The first opening 18*a* exposes a part of the glass plate 16 including the platen glass portion 16*a*. The second opening 18*b* exposes another part of the glass plate 16 including the contact glass portion 16*b*.

In the example shown in FIG. 5, the first opening 18*a* is a notch formed by cutting inward from the front surface side and the second direction D22 side surface side of the main body 101. Thus, the document sheet 9 on the platen glass portion 16*a* can be easily removed by sliding the document sheet 9 from the platen glass portion 16*a* to the front surface side or the side surface side. The first opening 18*a* is a rectangular hole.

It is noted that the first opening 18*a* may be a notch formed by cutting inward from the front surface side of the main body 101 in a rectangular shape. In this case, the document sheet 9 on the platen glass portion 16*a* can be removed by sliding the document sheet 9 from the platen glass portion 16*a* to the front surface side.

The scanning unit 10 is support by the main body 101. The scanning unit 10 is supported movably in the first direction D21 and the second direction D22 in a movable area extending below the platen glass portion 16*a* and below the contact glass portion 16*b*.

The unit drive device 17 moves the scanning unit 10 in the first direction D21 or the second direction D22 in the movable area. The unit drive device 17 includes a unit support portion 17*a*, a motor 17*b*, a power transmission mechanism 17*c*, and a motor drive circuit 17*d*.

The unit support portion 17*a* supports the scanning unit 10 movably along the sub-scanning direction D2. The motor 17*b* is a drive source of a mechanism for moving the scanning unit 10. The power transmission mechanism 17*c* converts the rotational force of the motor 17*b* into a force along the sub-scanning direction D2 and transmits the force to the scanning unit 10.

When the motor 17*b* rotates in a first rotational direction, the scanning unit 10 moves in the first direction D21. When the motor 17*b* rotates in a second rotational direction, the scanning unit 10 moves in the second direction D22.

The control device 5 operates the unit drive device 17 by outputting a direction command signal and a speed command signal to the motor drive circuit 17*d*.

The direction command signal is a signal that indicates the rotational direction of the motor 17*b*. That is, the direction command signal is a signal that indicates the moving direction of the scanning unit 10. The speed command signal is a signal that indicates the rotational speed of the motor 17*b*. That is, the speed command signal is a signal that indicates the moving speed of the scanning unit 10.

The motor drive circuit 17*d* rotates the motor 17*b* in a direction according to the direction command signal at a speed according to the speed command signal. That is, the unit drive device 17 moves the scanning unit 10 in a direction according to the direction command signal at a speed according to the speed command signal.

The motor 17*b* is a stepping motor. The motor drive circuit 17*d* outputs a continuous pulse signal having a frequency corresponding to the level of the speed command signal to the motor 17*b* as a drive signal. That is, the motor drive circuit 17*d* outputs the drive signal having a higher frequency to the motor 17*b* as the level of the speed command signal increases.

The motor 17*b* rotates at a speed proportional to the frequency of the drive signal. The scanning unit 10 moves at a speed proportional to the frequency of the drive signal. That is, the scanning unit 10 moves at a speed proportional to the level of the speed command signal.

The document sheet cover 102 is supported rotatably between a closed position and an open position. In the closed position, the document sheet cover 102 covers the upper surfaces of the platen glass portion 16*a* and the contact glass portion 16*b*. In the open position, the document sheet cover 102 opens the upper surfaces of the platen glass portion 16*a* and the contact glass portion 16*b*.

The image reading apparatus 1 can execute a stationary document sheet reading process. In the stationary document sheet reading process, the scanning unit 10 moves along the platen glass portion 16*a*, and the first CIS unit 1*x* reads an image of the lower surface of the document sheet 9 on the platen glass portion 16*a*.

The document sheet conveying device 15 is provided in the document sheet cover 102. The document sheet conveying device 15 feeds the document sheet 9 on a supply tray 151 to the conveying path 150. Further, the document sheet conveying device 15 conveys the document sheet 9 along the conveying path 150 through the upper surface of the contact glass portion 16*b*. Further, the document sheet conveying device 15 carries the document sheet 9 out of the conveying path 150 onto a discharge tray 152.

The image reading apparatus 1 is capable of executing a conveyed document sheet reading process with the document sheet cover 102 closed. In the conveyed document sheet reading process, the unit drive device 17 holds the scanning unit 10 below the contact glass portion 16*b*, and the document sheet conveying device 15 conveys the document sheet 9 along the conveying path 150. Further, the first CIS unit 1*x* reads an image of the lower surface of the document sheet 9 passing over the contact glass portion 16*b*.

The image reading apparatus 1 further includes a second CIS unit 1*y* provided in the document sheet cover 102. The second CIS unit 1*y* is disposed to face a portion of the conveying path 150 along the main body 101.

In the conveyed document sheet reading process, the second CIS unit 1*y* reads an image of the upper surface of the document sheet 9 passing over the contact glass portion 16*b*.

Figure 2:
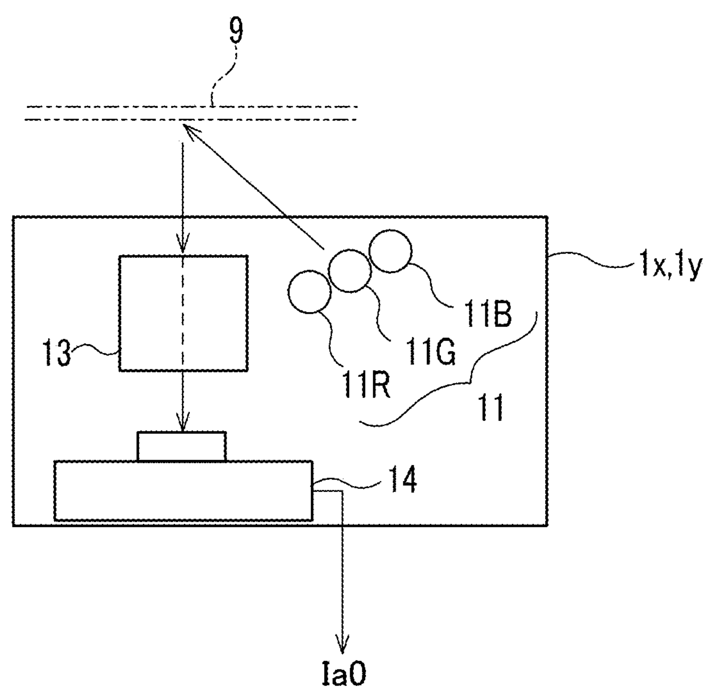
FIG. 2 is a configuration diagram of a CIS unit.

As shown in FIG. 2, each of the first CIS unit 1*x* and the second CIS unit 1*y* includes a light emitting portion 11, a lens 13, and an image sensor 14.

The light emitting portion 11, the lens 13, and the image sensor 14 are disposed along the main scanning direction D1. The longitudinal directions of the light emitting portion 11, the lens 13, and the image sensor 14 are the main scanning direction D1.

The light emitting portion 11 emits light. The light emitting portion 11 of the first CIS unit 1*x* emits light upward. The light emitting portion 11 of the second CIS unit 1*y* emits light downward.

The light emitted by the light emitting portion 11 is reflected by the document sheet 9. For example, the light emitting portion 11 includes a light source and a light guiding member disposed along the main scanning direction D1. The light guiding member guides the light of the light source incident from one end in the main scanning direction D1 and radiates the light in a direction that intersects the main scanning direction D1. For example, the light guiding member is a member made of synthetic resin.

The lens 13 is a condenser lens that guides reflected light of the light emitted from the light emitting portion 11 to the image sensor 14. The reflected light is light diffusely reflected by the document sheet 9. In addition, the reflected light may be light diffusely reflected by a first white reference portion 21, a second white reference portion 22, a first reference portion 23*a*, a second reference portion 23*b*, a third reference portion 23*c*, or a fourth reference portion 23*d*, which will be described later.

The image sensor 14 receives the reflected light and detects the amount of the reflected light. Further, the image sensor 14 outputs a line image signal Ia0 representing the detection result of the amount of the reflected light to the AFE 14*x*.

In the present embodiment, the image sensor 14 is a CMOS type line sensor. The lens 13 is an example of the light guiding member that guides the reflected light to the image sensor 14.

The image sensor 14 of the first CIS unit 1*x* is an example of the main image sensor. The image sensor 14 of the second CIS unit 1*y* is an example of the sub-image sensor.

The AFE 14*x* converts the analog line image signal Ia0 into digital line image data Id0 and outputs the line image data Id0 to the control device 5. The line image data Id0 includes a plurality of pixel data corresponding to one line in the main scanning direction D1.

Line image data Id0 of a plurality of lines corresponding to one page of the document sheet 9 is data of the read image corresponding to one page of the document sheet 9.

The image sensor 14 reads an image of the document sheet 9 as a color image. Accordingly, the data of the read image is data of a color image representing the amounts of the reflected light of three colors of red, green, and blue.

In the present embodiment, the light emitting portion 11 includes a red light emitting portion 11R, a green light emitting portion 11G, and a blue light emitting portion 11B, which emit red, green, and blue light, respectively. The line image data Id0 of three colors obtained when the red light emitting portion 11R, the green light emitting portion 11G, and the blue light emitting portion 11B sequentially emit light constitutes the data of the read image.

Figure 3:
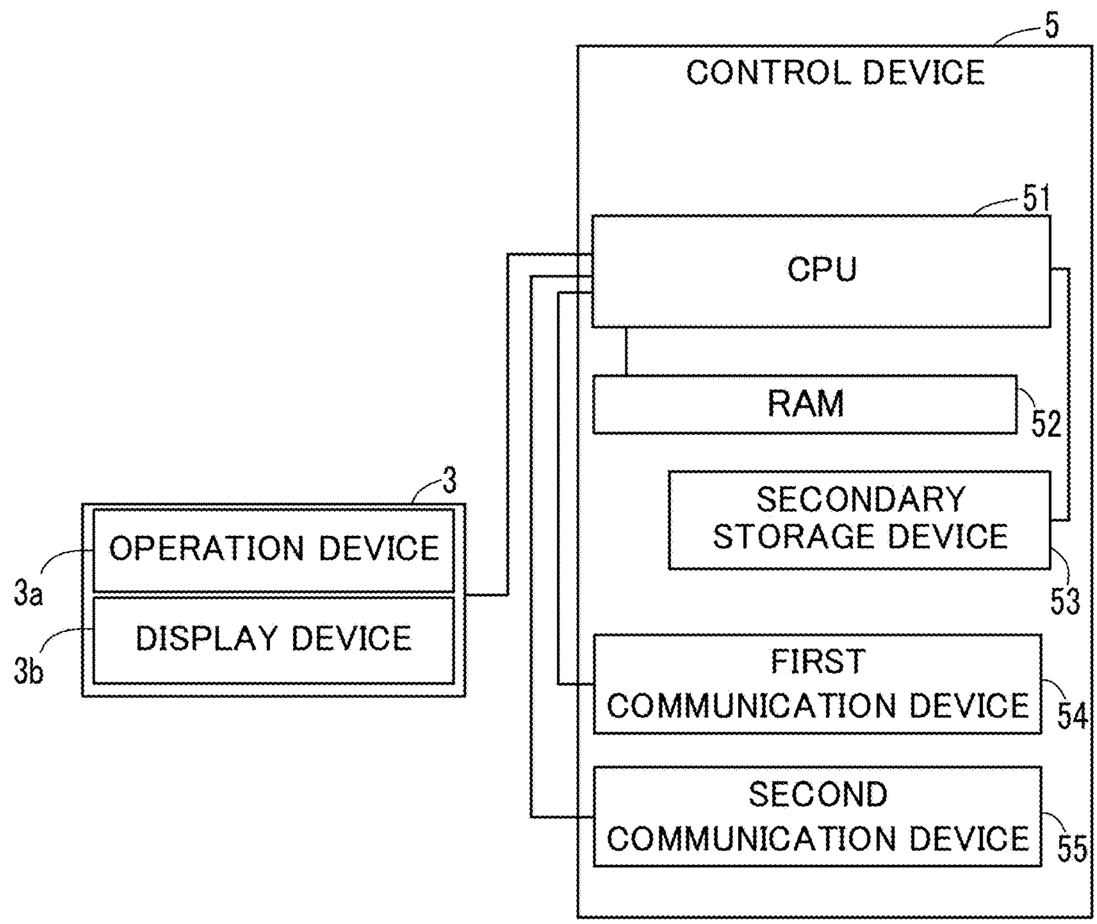
FIG. 3 is a block diagram showing a configuration of a user interface and a control device in the image reading apparatus according to the first embodiment.

As shown in FIG. 3, the user interface device 3 includes an operation device 3*a* and a display device 3*b*. The operation device 3*a* is a device that receives human operations, and includes, for example, operation buttons and a touch panel.

The display device 3*b* includes a display panel, such as a liquid crystal panel, capable of displaying images and other information. It is noted that the human operations include not only an operation by a human hand but also an operation by a human voice, an operation by a human eye line, and the like.

The control device 5 includes a central processing unit (CPU) 51, a RAM 52, a secondary storage device 53, a first communication device 54, a second communication device 55, and the like.

The secondary storage device 53 is a computer-readable nonvolatile storage device. The secondary storage device 53 can store computer programs and various types of data. For example, one or both of a solid state drive (SSD) and a hard disk drive are employed as the secondary storage device 53.

The CPU 51 is a processor that executes various types of data processing and control by executing the computer programs stored in the secondary storage device 53. It is also conceivable that another processor, such as a DSP, executes the data processing and control instead of the CPU 51.

The RAM 52 is a computer-readable volatile storage device. The RAM 52 is accessed by the CPU 51. The RAM 52 temporarily stores data to be processed by the CPU 51 and data generated by the CPU 51. The RAM 52 has a faster data access speed than the secondary storage device 53.

The CPU 51 can communicate with a host device (not shown), which is an external device, through a network such as a local area network (LAN). The host device is a computer capable of communicating with the image reading apparatus 1.

The first communication device 54 is an interface device that relays signal transmission or data communication between the CPU 51 and other devices included in the image reading apparatus 1. For example, the CPU 51 transmits a control command to the motor drive circuit 17*d* through the first communication device 54. In addition, the CPU 51 acquires the line image data Id0 from the AFE 14*x* through the first communication device 54.

The second communication device 55 is a communication interface device that performs communication with the host device through the network. The CPU 51 performs all of transmission and reception of data to and from the host device through the second communication device 55.

For example, the CPU 51 transmits the data of the read image obtained by the image reading process to the host device through the second communication device 55.

Figure 4:
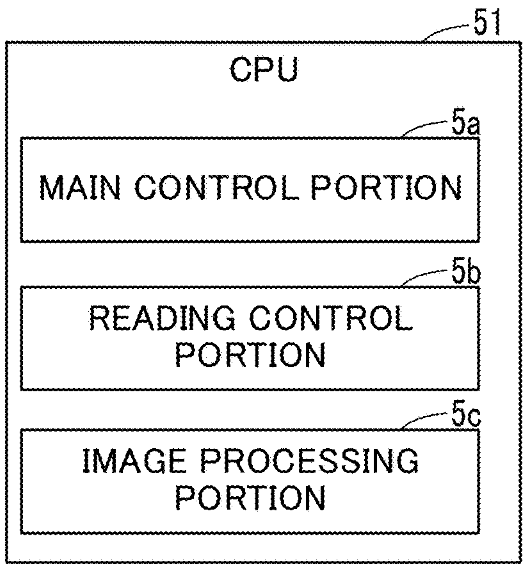
FIG. 4 is a block diagram showing a configuration of a processing module in a CPU of the image reading apparatus according to the first embodiment.

The CPU 51 includes a plurality of processing modules implemented by executing the computer programs. The plurality of processing modules include a main control portion 5*a*, a reading control portion 5*b*, an image processing portion 5*c*, and the like (see FIG. 4).

The main control portion 5*a* mainly monitors the operation on the operation device 3*a* and the data reception by the second communication device 55 and, when the operation or data reception is detected, controls the start of a process corresponding to the detected content.

The reading control portion 5*b* controls the motor drive circuit 17*d* and the first CIS unit 1*x* to cause the image reading apparatus 1 to execute the stationary document sheet reading process. Further, the reading control portion 5*b* controls the document sheet conveying device 15, the first CIS unit 1*x*, and the second CIS unit 1*y* to cause the image reading apparatus 1 to execute the conveyed document sheet reading process.

The image processing portion 5*c* executes various processes on the line image data Id0 obtained by the stationary document sheet reading process or the conveyed document sheet reading process. The image processing portion 5*c* is an example of the data processing portion that processes the line image data Id0 including a plurality of pixel data corresponding to the line image signal Ia0.

The reading control portion 5*b* controls the first CIS unit 1*x* and the motor drive circuit 17*d* to move the scanning unit 10 to a predetermined home position P1. The home position P1 is an initial position of the scanning unit 10 and is a position on the first direction D21 side with respect to the platen glass portion 16*a*.

In the stationary document sheet reading process, the reading control portion 5*b* moves the scanning unit 10 in the second direction D22 from the home position P1 to the end position of the reading range (see FIG. 1, FIG. 5, and FIG. 6).

The reading control portion 5*b* causes the first CIS unit 1*x* to start the image reading process at a timing when the scanning unit 10 has moved a predetermined approach distance from the home position P1.

The approach distance is a distance from the home position P1 to a position corresponding to the leading edge of the document sheet 9 on the platen glass portion 16*a*. While the scanning unit 10 moves the approach distance from the home position P1, the moving speed of the scanning unit 10 is stabilized.

Further, the reading control portion 5*b* moves the scanning unit 10 in the first direction D21 from the end position to the home position P1.

In the conveyed document sheet reading process, the reading control portion 5*b* moves the scanning unit 10 from the home position P1 to a reading position P2 below the contact glass portion 16*b*, and then stops the scanning unit 10 at the reading position P2 (see FIG. 1, FIG. 5, and FIG. 6).

The image reading apparatus 1 further includes the first white reference portion 21 and the second white reference portion 22 each of which is disposed along the main scanning direction D1 (see FIG. 5 and FIG. 6). The first white reference portion 21 has a white lower surface, and the second white reference portion 22 has a white upper surface. For example, each of the first white reference portion 21 and the second white reference portion 22 is a synthetic resin sheet or plate.

The first white reference portion 21 is disposed on the first direction D21 side with respect to the platen glass portion 16*a*. The first white reference portion 21 is disposed on a lower surface of a portion of the glass cover member 18 on the first direction D21 side with respect to the first opening 18*a* (see FIG. 6).

Specifically, the first white reference portion 21 is disposed on a lower surface of a portion of the glass cover member 18 between the first opening 18*a* and the second opening 18*b* (see FIG. 6). That is, the first white reference portion 21 is disposed in an area between the platen glass portion 16*a* and the contact glass portion 16*b* in the sub-scanning direction D2.

The second white reference portion 22 is disposed adjacent to the contact glass portion 16*b* on the second direction D22 side in an area of the upper surface of the glass plate 16 within the second opening 18*b* of the glass cover member 18 (see FIG. 6). That is, the second white reference portion 22 is disposed in an area between the platen glass portion 16*a* and the contact glass portion 16*b* in the sub-scanning direction D2.

In the present embodiment, the second white reference portion 22 is disposed at a distance on the first direction D21 side with respect to the first white reference portion 21.

As shown in FIG. 6, the main body 101 further includes a transparent film 24 adhered to a part of the upper surface of the main body 101. The transparent film 24 covers the upper surface of the contact glass portion 16*b* and the upper surface of the second white reference portion 22.

The transparent film 24 covers the step portion between the upper surface of the contact glass portion 16*b* and the edge of the second white reference portion 22 to form an inclined surface. Thus, the transparent film 24 prevents the document sheet 9 conveyed by the document sheet conveying device 15 from being caught by the step portion.

The home position P1 is a position below the first white reference portion 21 (see FIG. 6). The second CIS unit 1*y* is disposed to face the upper surface of the second white reference portion 22 (see FIG. 6).

The lower surface of the first white reference portion 21 and the upper surface of the second white reference portion 22 are uniform white surfaces with high diffuse reflectance.

The image processing portion 5*c* executes shading correction for the first CIS unit 1*x* using the line image data Id0 obtained by the first CIS unit 1*x* when the scanning unit 10 is at the home position P1. The shading correction is a process of setting a correction coefficient of the line image data Id0.

Further, the image processing portion 5*c* executes shading correction for the second CIS unit 1*y* using the line image data Id0 obtained by the second CIS unit 1*y* when the document sheet 9 is not conveyed.

As a reference example, it is conceivable that a mark representing the home position P1 is formed on the first white reference portion 21. In this reference example, the image processing portion 5*c* can detect that the scanning unit 10 has reached the home position P1 by detecting the mark from the line image data Id0.

The mark detection process of detecting a specific mark from the line image data Id0 requires a predetermined time. Therefore, when the unit drive device 17 executes the process of moving the scanning unit 10 as needed in accordance with the result of the mark detection process, a relatively long time is required for positioning the scanning unit 10.

However, it is desired to quickly position the scanning unit 10 at the home position P1.

It is also desired that the unit drive device 17 moves the scanning unit 10 to the home position P1 without causing the scanning unit 10 to collide with one end of the movable area.

On the other hand, it is not preferable to provide a dedicated sensor that detects that the scanning unit 10 has reached the home position P1, because the number of components increases.

In addition, the image reading apparatus 1 includes structures for executing the conveyed document sheet reading process. That is, the image reading apparatus 1 includes the contact glass portion 16*b* and the document sheet conveying device 15. As described above, the document sheet conveying device 15 conveys the document sheet 9 along the conveying path 150 through the upper surface of the contact glass portion 16*b*.

When the conveyed document sheet reading process is executed, the unit drive device 17 positions the scanning unit 10 at the reading position P2 below the contact glass portion 16*b*, whereas the document sheet conveying device 15 conveys the document sheet 9. The image sensor 14 of the first CIS unit 1*x* reads an image of the document sheet 9 passing over the contact glass portion 16*b*.

When the scanning unit 10 is positioned below the platen glass portion 16*a* or the contact glass portion 16*b*, the line image data Id0 is unspecified. In this way, even when there are a plurality of positions where the line image data Id0 is unspecified in the movable area of the scanning unit 10, it is desired to quickly position the scanning unit 10 at the home position P1.

The image reading apparatus 1 has a configuration for quickly positioning the scanning unit 10 at the home position P1 without causing the scanning unit 10 to collide with one end of the movable area. Hereinafter, the configuration will be described.

As shown in FIG. 5 and FIG. 6, the image reading apparatus 1 includes a first reference portion 23*a*, a second reference portion 23*b*, a third reference portion 23*c*, and a fourth reference portion 23*d*.

The first reference portion 23*a* is disposed along a side edge forming one end of the platen glass portion 16*a* in the main scanning direction D1, and has a lower surface of a first color. In the present embodiment, the first color is black.

The second reference portion 23*b* is disposed adjacent to the first reference portion 23*a* in the first direction D21. The second reference portion 23*b* has a lower surface of a second color different from the first color. In the present embodiment, the second color is white.

It is noted that the first color may be a color other than black. Similarly, the second color may be a color other than white. For example, the first color may be a black or dark brown color having a low light reflectance, and the second color may be a white or light yellow color having a high light reflectance.

The third reference portion 23*c* is disposed adjacent to the second reference portion 23*b* in the first direction D21. The third reference portion 23*c* has a lower surface of the first color. In the present embodiment, the color of the lower surface of the third reference portion 23*c* is black.

The fourth reference portion 23*d* is disposed adjacent to the third reference portion 23*c* in the first direction D21. The fourth reference portion 23*d* has a lower surface of the second color. In the present embodiment, the color of the lower surface of the fourth reference portion 23*d* is white.

In the present embodiment, the first white reference portion 21 includes the second reference portion 23*b*. That is, one end of the first white reference portion 21 in the main scanning direction D1 is the second reference portion 23*b*. Similarly, the second white reference portion 22 includes the fourth reference portion 23*d*. That is, one end of the second white reference portion 22 in the main scanning direction D1 is the fourth reference portion 23*d*. The upper and lower surfaces of the second white reference portion 22 are white.

The image reading apparatus 1 further includes an end reference portion 23*e* (see FIG. 5 and FIG. 6). The end reference portion 23*e* is disposed adjacent to the first reference portion 23*a* in the second direction D22 in an end area of the movable area in the second direction D22.

The length of the end reference portion 23*e* in the sub-scanning direction D2 is equal to or longer than a distance L4 from the end of the movable area in the first direction D21 to the end of the first reference portion 23*a* in the first direction D21 (see FIG. 6).

The end reference portion 23*e* has a lower surface of a specific color different from the first color and the second color. For example, the specific color is red, green, blue, yellow, magenta, or cyan. The specific color is an example of the third color different from the first color and the second color.

In the following description, an area in the main scanning direction D1 where an image of the document sheet 9 is read will be referred to as a reading target area A1 (see FIG. 5). In addition, an area adjacent to one end of the reading target area A1 in the main scanning direction D1 will be referred to as a reference area A2 (see FIG. 5).

The first white reference portion 21 and the second white reference portion 22 are formed over the reading target area A1 and the reference area A2 in the main scanning direction D1, respectively.

The areas occupied by the platen glass portion 16*a* and the contact glass portion 16*b* in the main scanning direction D1 include the reading target area A1 (see FIG. 5). The first reference portion 23*a*, the second reference portion 23*b*, the third reference portion 23*c*, the fourth reference portion 23*d*, and the end reference portion 23*e* are disposed in the reference area A2.

In the present embodiment, a part of the edge portion of the first opening 18*a* in the glass cover member 18 is the first reference portion 23*a* (see FIG. 5). The first reference portion 23*a* is formed along one end of the first opening 18*a* in the main scanning direction D1.

In addition, a part of the edge portion of the second opening 18*b* in the glass cover member 18 is the third reference portion 23*c* (see FIG. 5). The third reference portion 23*c* is formed along an end of the second opening 18*b* in the second direction D22.

Therefore, at least the lower surfaces of the first reference portion 23*a* and the third reference portion 23*c* of the glass cover member 18 are black. For example, the entire lower surface of the glass cover member 18 is black.

The end reference portion 23*e* is disposed on a lower surface of the edge portion of the first opening 18*a* in the glass cover member 18 (see FIG. 6). For example, the end reference portion 23*e* is a synthetic resin sheet or plate.

[Home Positioning Control]

Next, an example of the procedure of the home positioning control will be described with reference to the flowchart shown in FIG. 7.

The home positioning control is executed to position the scanning unit 10 at the home position P1. The reading control portion 5*b* starts the home positioning control when the image reading apparatus 1 is activated.

In the following description, S101, S102, . . . represent identification codes of a plurality of steps in the home positioning control. In the home positioning control, the reading control portion 5*b* first starts the process of step S101.

<Step S101>

In step S101, the reading control portion 5*b* executes color determination control.

The color determination control includes causing the first CIS unit 1*x* to execute a line image reading process and causing the image processing portion 5*c* to execute a color determination process.

In the line image reading process, the reading control portion 5*b* causes the light emitting portion 11 to emit light and operates the image sensor 14. For example, in the line image reading process, the reading control portion 5*b* sequentially causes the red light emitting portion 11R, the green light emitting portion 11G, and the blue light emitting portion 11B to emit light one by one.

In the color determination process, the image processing portion 5*c* determines whether one or more reference pixel data in the line image data Id0 obtained by the line image reading process is data of black, white, or the specific color. The reference pixel data is one or more pixel data corresponding to the reference area A2 in the line image data Id0.

The reference area A2 is an area corresponding to the first reference portion 23*a*, the second reference portion 23*b*, the third reference portion 23*c*, or the fourth reference portion 23*d* in the main scanning direction D1 (see FIG. 5).

Here, the reference pixel data corresponding to the light emission of the red light emitting portion 11R is referred to as red reference data, the reference pixel data corresponding to the light emission of the green light emitting portion 11G is referred to as green reference data, and the reference pixel data corresponding to the light emission of the blue light emitting portion 11B is referred to as blue reference data.

When the specific color is red, green, blue, yellow, magenta, or cyan, the image processing portion 5*c* executes a binarization process for the red reference data, the green reference data, and the blue reference data. Further, the image processing portion 5*c* determines the color of the reference pixel data based on the three binarized values obtained by the binarization processes.

For example, when the specific color is red, green, or blue, the image processing portion 5*c* determines that the reference pixel data is the data of the specific color when only one of the three binarized values corresponding to the specific color is a High value.

Further, the image processing portion 5*c* determines that the reference pixel data is the data of white when one of the three binarized values corresponding to one of the two colors other than the specific color is a High value.

Furthermore, the image processing portion 5*c* determines that the reference pixel data is the data of black when one of the three binarized values corresponding to one of the two colors other than the specific color is a Low value.

In the following description, of the three primary colors of red, green, and blue, the two colors constituting yellow, magenta, or cyan will be referred to as two component colors.

When the specific color is yellow, magenta, or cyan, the image processing portion 5*c* determines that the reference pixel data is data of the specific color when only two of the three binarized values corresponding to the two component colors are High values.

Furthermore, the image processing portion 5*c* determines that the reference pixel data is the data of white when one of the three binarized values corresponding to one color other than the two component colors is a High value.

Furthermore, the image processing portion 5*c* determines that the reference pixel data is the data of black when one of the three binarized values corresponding to one color other than the two constituent colors is a Low value.

As described above, when the specific color is red, green, blue, yellow, magenta, or cyan, the color determination process is realized by the binarization process and the determination process of the three binarized values.

When the result of the color determination process is white, the reading control portion 5*b* executes the process of step S102. On the other hand, when the result of the color determination process is black or the specific color, the reading control portion 5*b* executes the process of step S109.

<Step S102>

In step S102, the reading control portion 5*b* causes the unit drive device 17 to execute an operation of moving the scanning unit 10 in the first direction D21 by a first distance. The first distance is an example of the first confirmation distance.

The first distance is a distance from the home position P1 to within the area of the fourth reference portion 23*d* in the sub-scanning direction D2. For example, the first distance is a distance L1 from the home position P1 to the center line of the fourth reference portion 23*d* in the sub-scanning direction D2 (see FIG. 6).

Hereinafter, the operation of the unit drive device 17 in step S102 will be referred to as a first drive operation. The reading control portion 5*b* executes the process of step S103 after executing the process of step S102.

<Step S103>

In step S103, the reading control portion 5*b* executes the color determination control when the scanning unit 10 is stopped at a position where the scanning unit 10 has reached by the first drive operation.

The reading control portion 5*b* executes the process of step S104 when the result of the color determination process is white, and executes the process of step S109 when the result of the color determination process is black.

It is noted that the reading control portion 5*b* executes the process of step S110 when the result of the color determination process is the specific color.

<Step S104>

In step S104, the reading control portion 5*b* causes the unit drive device 17 to execute an operation of moving the scanning unit 10 in the second direction D22 by a second distance.

The second distance is a distance from within the area of the fourth reference portion 23*d* to within the area of the first reference portion 23*a* in the sub-scanning direction D2. The second distance is longer than the first movement distance.

For example, the second distance is a distance obtained by adding a slight margin length to a distance L2 from the center line of the fourth reference portion 23*d* in the sub-scanning direction D2 to the end of the first reference portion 23*a* in the first direction D21 (see FIG. 6).

Hereinafter, the operation of the unit drive device 17 in step S104 will be referred to as a second drive operation. The reading control portion 5*b* executes the process of step S105 after executing the process of step S104.

When the image reading apparatus 1 is activated, the scanning unit 10 is at the home position P1 in many cases.

When the scanning unit 10 is at the home position P1 at the start of the home positioning control, the scanning unit 10 reaches a pre-adjustment position by the processes of step S101 to step S104. The pre-adjustment position is a position of the scanning unit 10 facing a portion of the first reference portion 23*a* close to the end of the first reference portion 23*a* in the first direction D21.

Accordingly, the scanning unit 10 moves to the pre-adjustment position in two moves in many cases.

<Step S105>

In step S105, the reading control portion 5*b* executes the color determination control when the scanning unit 10 is stopped at a position where the scanning unit 10 has reached by the second drive operation.

The reading control portion 5*b* executes the process of step S106 when the result of the color determination process is black, and executes the process of step S109 when the result of the color determination process is white.

It is noted that the reading control portion 5*b* executes the process of step S110 when the result of the color determination process is the specific color.

If the scanning unit 10 is at the home position P1 when the home positioning control is started, the processes of step S101 to step S105 are executed.

<Step S106>

In step S106, the reading control portion 5*b* causes the unit drive device 17 to execute an operation of moving the scanning unit 10 in the first direction D21 by a reference distance.

The reference distance is a distance shorter than the first distance and the second distance. The reference distance is preset in accordance with the accuracy required for positioning the scanning unit 10 to the home position P1. Accordingly, the reference distance is a very small distance.

Hereinafter, the operation of the unit drive device 17 in step S106 will be referred to as a third drive operation. The reading control portion 5*b* executes the process of step S107 after executing the process of step S106.

<Step S107>

In step S107, the reading control portion 5*b* executes the color determination control when the scanning unit 10 is stopped at a position where the scanning unit 10 has reached by the third drive operation.

The reading control portion 5*b* executes the process of step S108 when the result of the color determination process is white, and executes the processes of step S106 and step S107 again when the result of the color determination process is black.

That is, the unit drive device 17 executes the third drive operation of moving the scanning unit 10 in the first direction D21 by the reference distance one or more times until it is determined that the reference pixel data is white data (see step S106 and step S107).

The scanning unit 10 is moved to a position facing the end of the second reference portion 23*b* in the second direction D22 by the third drive operation performed one or more times.

It is noted that the reading control portion 5*b* executes the process of step S110 when the result of the color determination process is the specific color.

<Step S108>

In step S108, the reading control portion 5*b* causes the unit drive device 17 to execute an operation of moving the scanning unit 10 in the first direction D21 by a third distance.

The third distance is a distance L3 from the end of the second reference portion 23*b* in the second direction D22 to the home position P1 in the sub-scanning direction D2 (see FIG. 6). The third distance is shorter than the first distance and the second distance, and longer than the reference distance.

Hereinafter, the operation of the unit drive device 17 in step S108 will be referred to as a completion drive operation. The completion drive operation is executed when it is determined that the reference pixel data is white data after the third drive operation is performed. The third distance is an example of the final adjustment distance.

The unit drive device 17 positions the scanning unit 10 at the home position P1 by executing the completion drive operation. The positioning error of the scanning unit 10 is approximately the reference distance. The reading control portion 5*b* ends the home positioning control after executing the process of step S108.

<Step S109>

In step S109, the reading control portion 5*b* executes pre-adjustment control to be described later. The pre-adjustment control is a process for moving the scanning unit 10 to the pre-adjustment position.

After executing the pre-adjustment control, the reading control portion 5*b* executes the processes of step S106 to step S108.

By the processes of step S101 to step S105 or the process of step S109, the scanning unit 10 has reached the pre-adjustment position before the third drive operation of step S106 is started. The pre-adjustment position is a position close to the boundary between the first reference portion 23*a* and the second reference portion 23*b*.

Therefore, the unit drive device 17 can position the scanning unit 10 at the home position P1 only by executing the third drive operation a relatively small number of times and the completion drive operation once.

<Step S110>

In step S110, the reading control portion 5*b* executes a predetermined error process. For example, the error process includes a process of outputting an error message to the display device 3*b*.

The reading control portion 5*b* forcibly terminates the home positioning control after executing the process of step S110. In this case, the positioning of the scanning unit 10 is ended without being completed.

[Pre-Adjustment Control]

Next, an example of the procedure of the pre-adjustment control will be described with reference to the flowchart shown in FIG. 8.

In the following description, S201, S202, . . . represent identification codes of a plurality of steps in the pre-adjustment control.

In the pre-adjustment control, when the determination result of the immediately preceding color determination control is white or black, the reading control portion 5*b* first executes the process of step S201. On the other hand, in the pre-adjustment control, when the determination result of the immediately preceding color determination control is the specific color, the reading control portion 5*b* first executes the process of step S207.

Figure 7:
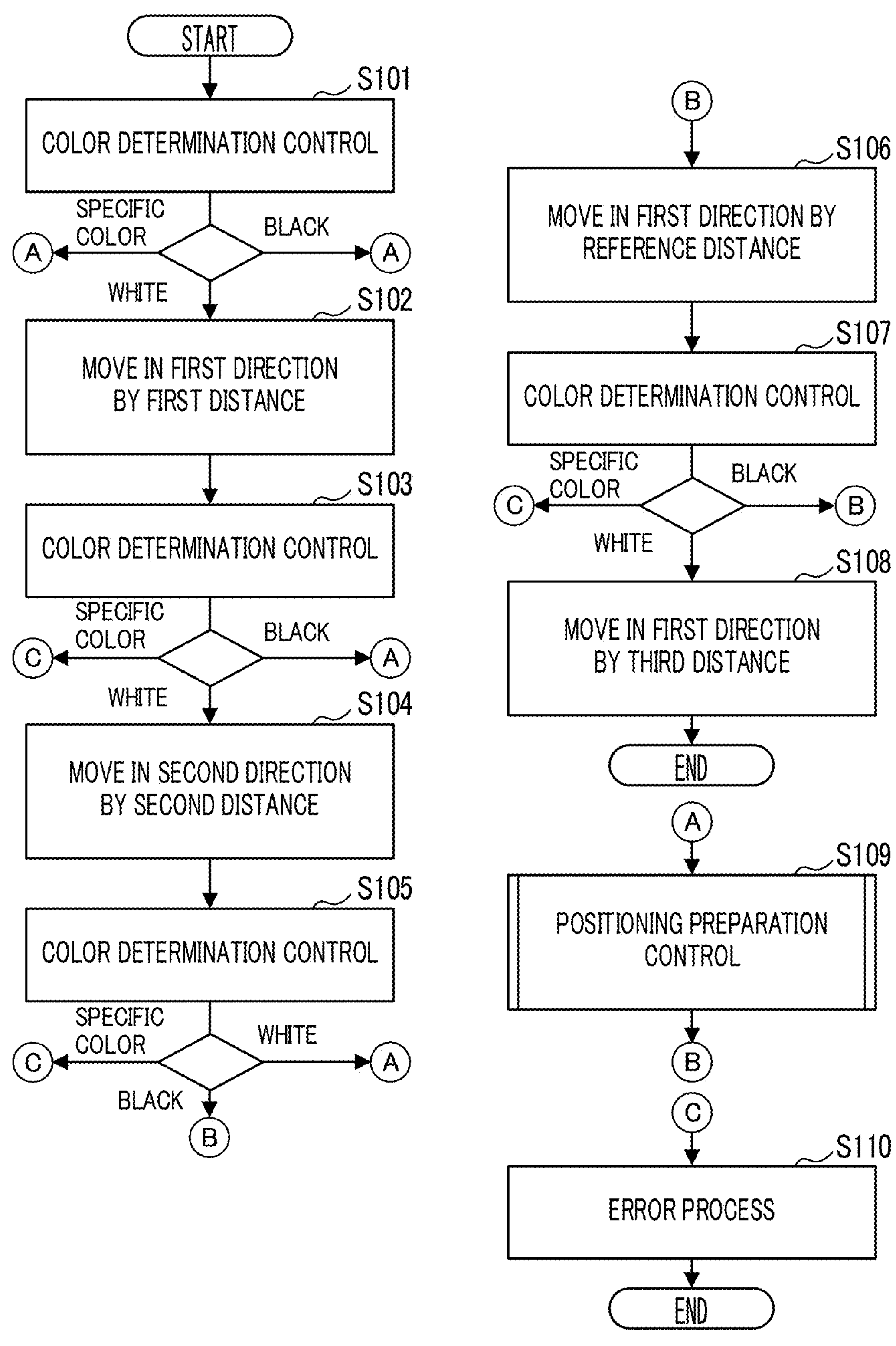
FIG. 7 is a flowchart showing an example of the procedure of home positioning control in the image reading apparatus according to the first embodiment.

The immediately preceding color determination control is the process of step S101, step S103, or step S105 (see FIG. 7).

<Step S201>

In step S201, the reading control portion 5*b* causes the unit drive device 17 to execute an operation of moving the scanning unit 10 in the second direction D22 by a fourth distance.

The fourth distance is a distance set so that the scanning unit 10 is reliably moved to a position facing the first reference portion 23*a* regardless of its position before the movement. The fourth distance is longer than a distance L4 from the end of the movable area in the first direction D21 to the end of the first reference portion 23*a* in the first direction D21 (see FIG. 6).

The fourth distance is equal to or less than the length of the end reference portion 23*e* in the sub-scanning direction D2.

Hereinafter, the operation of the unit drive device 17 in step S201 will be referred to as a fourth drive operation. The reading control portion 5*b* executes the process of step S202 after executing the process of step S201.

<Step S202>

In step S202, the reading control portion 5*b* executes the color determination control when the scanning unit 10 is stopped at a position where the scanning unit 10 has reached by the fourth drive operation.

The reading control portion 5*b* executes the process of step S203 when the result of the color determination process is black, and executes the process of step S208 when the result of the color determination process is white.

In addition, the reading control portion 5*b* executes the process of step S207 when the result of the color determination process is the specific color.

<Step S203>

In step S203, the reading control portion 5*b* causes the unit drive device 17 to execute an operation of moving the scanning unit 10 in the first direction D21 by a fifth distance.

The fifth distance is shorter than the width of the second reference portion 23*b* in the sub-scanning direction D2 and longer than the reference distance.

Hereinafter, the operation of the unit drive device 17 in step S203 will be referred to as a fifth drive operation. The reading control portion 5*b* executes the process of step S204 after executing the process of step S203.

The process of step S204 may be executed following a seventh drive operation of step S207 to be described later.

<Step S204>

In step S204, the reading control portion 5*b* executes the color determination control when the scanning unit 10 is stopped at a position where the scanning unit 10 has reached by the fifth drive operation or the seventh drive operation.

The reading control portion 5*b* executes the process of step S205 when the result of the color determination process is white, and executes the processes of step S203 and step S204 again when the result of the color determination process is black.

In addition, the reading control portion 5*b* executes the process of step S208 when the result of the color determination process is the specific color.

<Step S205>

In step S205, the reading control portion 5*b* causes the unit drive device 17 to execute an operation of moving the scanning unit 10 in the second direction D22 by the fifth distance.

Hereinafter, the operation of the unit drive device 17 in step S205 will be referred to as a sixth drive operation. The reading control portion 5*b* executes the process of step S206 after executing the process of step S205.

When the unit drive device 17 executes the sixth drive operation, the scanning unit 10 is moved to a position facing a portion of the first reference portion 23*a* close to the end of the first reference portion 23*a* in the first direction D21.

<Step S206>

In step S206, the reading control portion 5*b* executes the color determination control when the scanning unit 10 is stopped at a position where the scanning unit 10 has reached by the sixth drive operation.

When the result of the color determination process is black, the reading control portion 5*b* ends the pre-adjustment control, and executes the process of step S106 and subsequent processes (see FIG. 7). When the result of the color determination process is white or the specific color, the reading control portion 5*b* executes the process of step S208.

<Step S207>

In step S207, the reading control portion 5*b* causes the unit drive device 17 to execute an operation of moving the scanning unit 10 in the first direction D21 by a sixth distance. The sixth distance is longer than the fourth distance.

For example, the sixth distance is a distance slightly shorter than the distance from the end of the end reference portion 23*e* in the first direction D21 to the end of the first reference portion 23*a* in the first direction D21.

The operation of the unit drive device 17 in step S207 is the seventh drive operation. The reading control portion 5*b* executes the process of step S204 after executing the process of step S207.

<Step S208>

In step S208, the reading control portion 5*b* executes a predetermined error process. For example, the error process includes a process of outputting an error message to the display device 3*b*.

The reading control portion 5*b* forcibly terminates the home positioning control after executing the process of step S207. Thus, the process of step S106 and subsequent processes are not executed, and the positioning of the scanning unit 10 ends without being completed. (see FIG. 7).

The first drive operation in step S102, the second drive operation in step S104, the third drive operation in step S106, and the completion drive operation in step S108 are an example of the plurality of trial drive operations. Further, the fourth drive operation in step S201, the fifth drive operation in step S203, the sixth drive operation in step S205, and the seventh drive operation in step S207 are also an example of the plurality of trial drive operations.

The plurality of trial drive operations are a plurality of operations of the unit drive device 17 each having a different direction or a distance for moving the scanning unit 10.

In the home positioning control, the reading control portion 5*b* sequentially selects a plurality of drive operations from the plurality of trial drive operations, and causes the unit drive device 17 to execute the plurality of drive operations (see step S101 to step S109 and step S201 to step S207).

In other words, the unit drive device 17 executes a plurality of drive operations sequentially selected from the plurality of trial drive operations in accordance with the determination result of the color determination process (see step S101 to step S109 and step S201 to step S207).

The reading control portion 5*b* positions the scanning unit 10 at the home position P1 by causing the unit drive device 17 to execute the plurality of drive operations.

The home position P1 is a position on the first direction D21 side with respect to the platen glass portion 16*a*. In the present embodiment, the home position P1 is a position between the platen glass portion 16*a* and the contact glass portion 16*b* in the sub-scanning direction D2.

In the present embodiment, the unit drive device 17 executes the first drive operation when it is determined that the reference pixel data is white data (see step S101 and step S102). The first drive operation is an example of the first confirmation operation. The first distance in the first drive operation is an example of the first confirmation distance.

Further, the unit drive device 17 executes the second drive operation when it is determined that the reference pixel data is white data after the first drive operation is performed (see step S103 and step S104). The second drive operation is an example of the second confirmation operation. The second distance in the second drive operation is an example of the second confirmation distance.

When the scanning unit 10 is at the home position P1 at the start of the home positioning control, the scanning unit 10 is moved to the pre-adjustment position by the first drive operation and the second drive operation.

The unit drive device 17 executes the fourth drive operation when it is determined that the reference pixel data is black data (see step S101, step S109, and step S201). The fourth drive operation is an example of the first pre-adjustment operation. The fourth distance in the fourth drive operation is an example of the first pre-adjustment distance.

When the scanning unit 10 is at a position where the scanning unit 10 does not face any of the second reference portion 23*b*, the fourth reference portion 23*d*, and the end reference portion 23*e* at the start of the home positioning control, the fourth drive operation is executed.

When the scanning unit 10 is at a position farther than the fourth distance in the first direction D21 from the end reference portion 23*e* at the start of the home positioning control, the scanning unit 10 is moved to a position facing the first reference portion 23*a* by the fourth drive operation.

The unit drive device 17 executes the seventh drive operation when it is determined that the reference pixel data is the data of the specific color (see step S101, step S109, and step S207). The seventh drive operation is an example of the second pre-adjustment operation. The sixth distance in the seventh drive operation is an example of the second pre-adjustment distance that is longer than the first pre-adjustment distance.

The determination of the specific color and the execution of the seventh drive operation prevent the scanning unit 10 from colliding with one end of the movable area.

When the scanning unit 10 is at a position facing the end reference portion 23*e* at the start of the home positioning control, the scanning unit 10 is moved to a position facing a portion of the first reference portion 23*a* close to the second reference portion 23*b* by the seventh drive operation.

When the scanning unit 10 is at a position closer to the end reference portion 23*e* than the fourth distance in the first direction D21 at the start of the home positioning control, the scanning unit 10 is moved to a position facing a portion of the first reference portion 23*a* close to the second reference portion 23*b* by the fourth drive operation and the seventh drive operation.

When it is determined that the reference pixel data is black data after the fourth drive operation or the seventh drive operation is performed, the unit drive device 17 executes the fifth drive operation one or more times until it is determined that the reference pixel data is white data (see step S203 and step S204).

The fifth drive operation is an example of the first coarse adjustment operation. The fifth distance in the fifth drive operation is an example of the coarse adjustment distance that is shorter than the first pre-adjustment distance. The scanning unit 10 is moved to a position facing the second reference portion 23*b* by performing the fifth drive operation one or more times.

When it is determined that the reference pixel data is white data after the fifth drive operation or the seventh drive operation is performed, the unit drive device 17 executes the sixth drive operation (see step S204 and step S205).

The sixth drive operation is an example of the second coarse adjustment operation. The scanning unit 10 is moved to the pre-adjustment position by the sixth drive operation.

When it is determined that the reference pixel data is black data after the second drive operation in step S104 or the sixth drive operation in step S205 is performed, the unit drive device 17 executes the processes of step S106 to step S107.

In step S106 to step S107, the unit drive device 17 executes the third drive operation one or more times until it is determined that the reference pixel data is white data.

The third drive operation is an example of the fine adjustment operation. The reference distance in the third drive operation is shorter than the coarse adjustment distance.

When it is determined that the reference pixel data is white data after the third drive operation is performed, the unit drive device 17 executes the completion drive operation (see step S107 and step S108). By executing the completion drive operation, the scanning unit 10 is positioned at the home position P1.

When causing the unit drive device 17 to execute the plurality of drive operations, the reading control portion 5*b* outputs, to the motor drive circuit 17*d*, the speed command signal of a different level depending on the moving distance of the scanning unit 10.

In the following description, the first drive operation in step S102, the second drive operation in step S104, the fourth drive operation in step S201, and the seventh drive operation in step S207 will be referred to as a long-distance adjustment operation group.

Similarly, the fifth drive operation in step S203 and the sixth drive operation in step S205 will be referred to as a middle-distance adjustment operation group.

The long-distance adjustment operation group and the middle-distance adjustment operation group are examples of the pre-adjustment operation of moving the scanning unit 10 in the first direction D21 or the second direction D22 by a pre-adjustment distance determined in accordance with the determination result of the color determination process, which is performed one or more times.

When it is determined that the reference image data is black data after some operations of the long-distance adjustment operation group and the middle-distance adjustment operation group are performed, the reading control portion 5*b* executes the processes of step S106 and step S107 (see FIG. 7). In step S106 and step S107, the reading control portion 5*b* causes the unit drive device 17 to execute the third drive operation until it is determined that the reference pixel data is white data.

As described above, the reference distance is shorter than the moving distance of the scanning unit 10 in the long-distance adjustment operation group, the middle-distance adjustment operation group, and the completion drive operation in step S108. The reference distance is a moving distance of the scanning unit 10 in the third drive operation in step S106.

Figure 13:
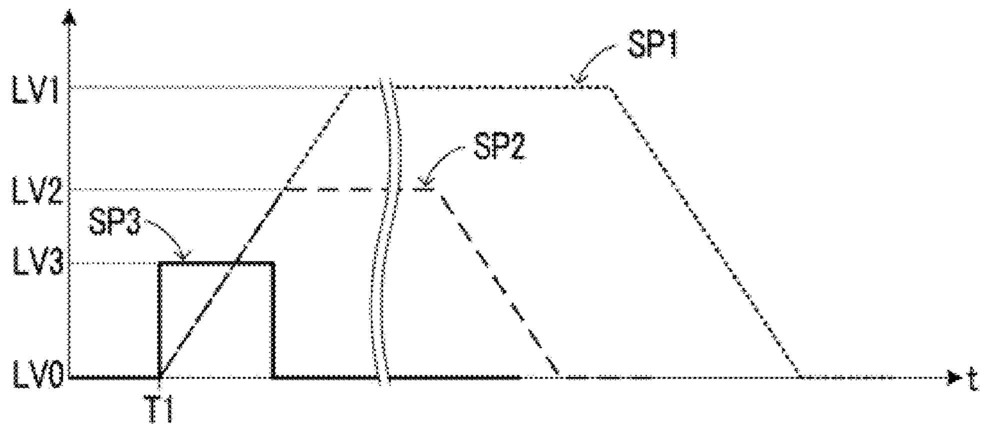
FIG. 13 is a diagram showing an example of a time chart of a speed command signal in the image reading apparatus according to the first embodiment or the second embodiment.

For example, the reading control portion 5*b* outputs a first pattern signal SP1 as the speed command signal when causing the unit drive device 17 to execute any operation of the long-distance adjustment operation group (see FIG. 13).

Further, the reading control portion 5*b* outputs a second pattern signal SP2 as the speed command signal when causing the unit drive device 17 to execute any operation of the middle-distance adjustment operation group and the completion drive operation in step S108 (see FIG. 13).

On the other hand, the reading control portion 5*b* outputs a third pattern signal SP3 as the speed command signal when causing the unit drive device 17 to execute the third drive operation in step S106 (see FIG. 13).

As shown in FIG. 13, the first pattern signal SP1 is a trapezoidal wave signal whose signal level gradually increases from a zero level LV0 to a first set level LV1 and then gradually decreases to the zero level LV0. Similarly, the second pattern signal SP2 is a trapezoidal wave signal whose signal level gradually increases from the zero level LV0 to a second set level LV2 and then gradually decreases to the zero level LV0.

The zero level LV0 signal is a signal for stopping the motor 17*b*. That is, the zero level LV0 signal is a signal for stopping the scanning unit 10.

The third pattern signal SP3 is a rectangular wave signal whose signal level rises sharply from the zero level LV0 to a reference level LV3 and then falls sharply to the zero level LV0 (see FIG. 13). The reference level LV3 is lower than the first set level LV1 and the second set level LV2.

The first set level LV1 and the second set level LV2 are levels determined in accordance with the moving distance of the scanning unit 10. The moving distance of the scanning unit 10 in the long-distance adjustment operation group is longer than the moving distance of the scanning unit 10 in the middle-distance adjustment operation group. The first set level LV1 corresponding to the long-distance adjustment operation group is larger than the second set level LV2 corresponding to the middle-distance adjustment operation group (see FIG. 13).

The area occupied by the waveform of the speed command signal corresponds to the moving distance of the scanning unit 10 (see FIG. 13).

When the third pattern signal SP3 is output to the motor drive circuit 17*d* as the speed command signal, the motor 17*b* quickly accelerates from the stopped state to the rotational speed corresponding to the reference level LV3.

On the other hand, when a rectangular wave signal exceeding the reference level LV3 is output to the motor drive circuit 17*d* as the speed command signal, a step-out occurs in the motor 17*b*. The reference level LV3 in the third pattern signal SP3 is set in accordance with the characteristics of the motor 17*b*.

The reference distance in the third drive operation is a very short distance. When the third pattern signal SP3 is output as the speed command signal, the scanning unit 10 is moved more quickly by the reference distance.

On the other hand, the moving distance of the scanning unit 10 in the long-distance adjustment operation group is relatively long. In this case, when the first pattern signal SP1 is output as the speed command signal, the scanning unit 10 is moved more quickly by a desired distance. In addition, a step-out does not occur in the motor 17*b*.

In addition, in the middle-distance adjustment operation group, when the second pattern signal SP2 is output as the speed command signal, the scanning unit 10 moves stably and quickly. In addition, a step-out does not occur in the motor 17*b*.

By employing the image reading apparatus 1, the scanning unit 10 can be quickly positioned at the home position P1. In addition, by employing the end reference portion 23*e*, the scanning unit 10 can be positioned at the home position P1 without colliding with one end of the movable area.

Second Embodiment

Next, an image reading apparatus 1A according to a second embodiment will be described with reference to FIG. 9 to FIG. 11. Hereinafter, the differences from the image reading apparatus 1 in the image reading apparatus 1A will be described.

[Configuration of Image Reading Apparatus 1A]

Figure 10:
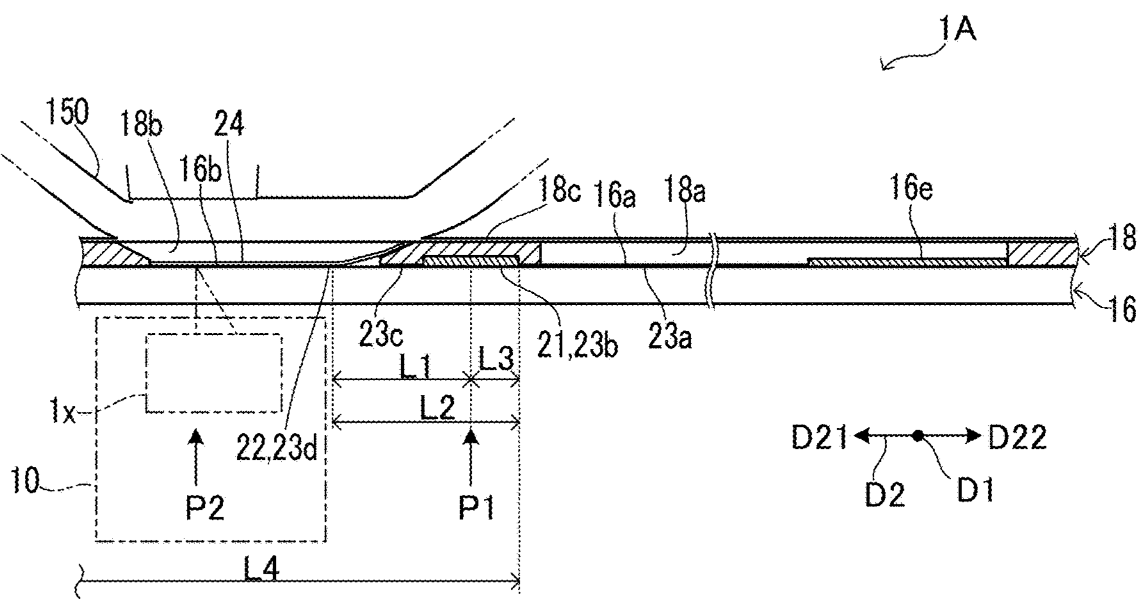
FIG. 10 is a cross-sectional view of an upper portion of a main body of the image reading apparatus according to the second embodiment.

The image reading apparatus 1A has a configuration in which the fourth reference portion 23*d* is removed from the image reading apparatus 1 (see FIG. 10).

Figure 9:
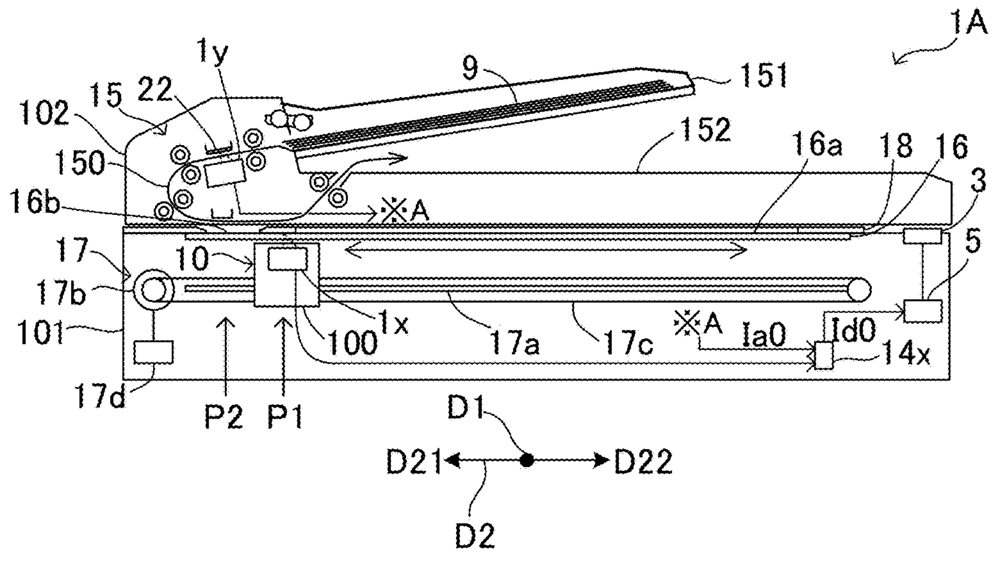
FIG. 9 is a configuration diagram of an image reading apparatus according to a second embodiment.

For example, the image reading apparatus 1A has a configuration in which the positions of the second CIS unit 1*y* and the second white reference portion 22 are different from those of the image reading apparatus 1 (see FIG. 9).

In the example shown in FIG. 9, the second CIS unit 1*y* is disposed to face a part of the conveying path 150 from below. The second white reference portion 22 is disposed to face the second CIS unit 1*y* with the conveying path 150 interposed therebetween.

In the image reading apparatus 1A, the second white reference portion 22 does not have the fourth reference portion 23*d* located in the reference area A2.

In the image reading apparatus 1A, the first white reference portion 21 is disposed on a lower surface of a portion of the glass cover member 18 on the first direction D21 side with respect to the first opening 18*a* (see FIG. 10).

[Home Positioning Control]

Figure 11:
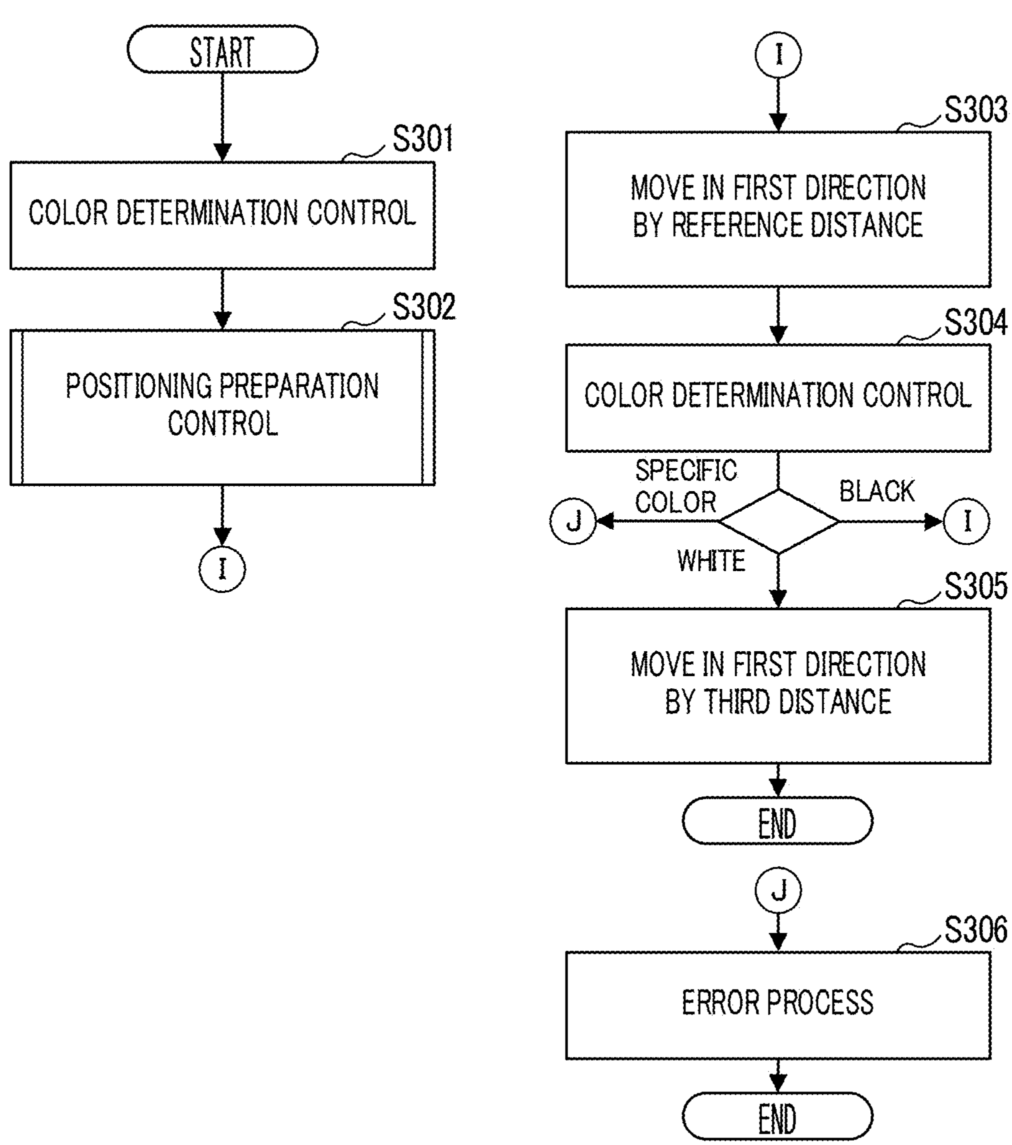
FIG. 11 is a flowchart showing an example of the procedure of home positioning control in the image reading apparatus according to the second embodiment.

In the present embodiment, the reading control portion 5*b* executes, for example, the home positioning control shown in FIG. 11, instead of the home positioning control shown in FIG. 7. The reading control portion 5*b* starts the home positioning control when the image reading apparatus 1A is activated.

In the following description, S301, S302, . . . represent identification codes of a plurality of steps in the home positioning control by the image reading apparatus 1A. In the home positioning control, the reading control portion 5*b* first starts the process of step S301.

<Step S301>

In step S301, the reading control portion 5*b* executes the color determination control. Step S301 corresponds to step S101 in FIG. 7.

The reading control portion 5*b* executes the process of step S302 after executing the process of step S101. The result of the color determination process in step S301 is reflected in the process of step S302.

<Step S302>

Figure 8:
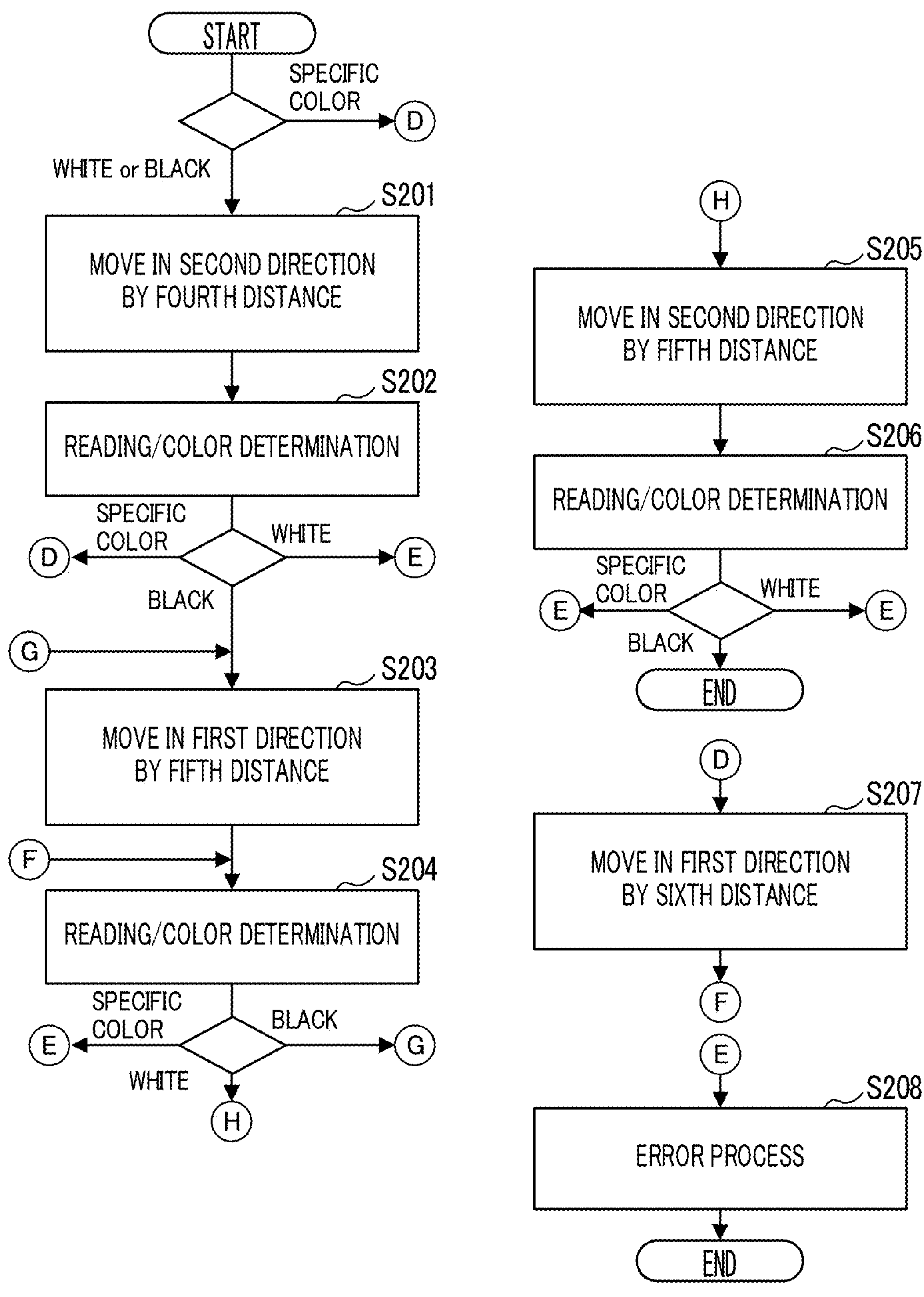
FIG. 8 is a flowchart showing an example of the procedure of pre-adjustment control in the image reading apparatus according to the first embodiment.

In step S302, the reading control portion 5*b* executes the pre-adjustment control (see FIG. 8). The pre-adjustment control is a process for moving the scanning unit 10 to the pre-adjustment position.

The result of the color determination process in step S301 is reflected in the selection of the first process in the pre-adjustment control (see FIG. 8).

That is, when it is determined in step S301 that the reference pixel data is not the data of the specific color, the reading control portion 5*b* executes the process of step S201 and subsequent processes (see FIG. 8).

On the other hand, when it is determined in step S301 that the reference pixel data is the data of the specific color, the reading control portion 5*b* executes the process of step S207 (see FIG. 8).

After executing the pre-adjustment control, the reading control portion 5*b* executes the processes of step S303 to step S305.

<Steps S303 to S305>

In step S303 to step S305, the reading control portion 5*b* executes the same processes as step S106 to step S108 in FIG. 7.

It is noted that, when it is determined in step S304 corresponding to step S107 that the reference pixel data is the data of the specific color, the reading control portion 5*b* executes the process of step S306.

<Step S306>

In step S306, the reading control portion 5*b* executes the error process as in step S110 in FIG. 7.

The reading control portion 5*b* forcibly terminates the home positioning control after executing the process of step S306. In this case, the positioning of the scanning unit 10 is ended without being completed.

In the present embodiment, the unit drive device 17 executes the fourth drive operation when it is determined that the reference pixel data is not the data of the specific color (see step S301, step S302, and step S201). The fourth distance is an example of the first pre-adjustment operation.

Further, the unit drive device 17 executes the seventh drive operation when it is determined that the reference pixel data is the data of the specific color (see step S301, step S302, and step S207). The seventh drive operation is an example of the second pre-adjustment operation.

When it is determined that the reference pixel data is black data after the fourth drive operation or the seventh drive operation is performed, the unit drive device 17 executes the fifth drive operation one or more times until it is determined that the reference pixel data is white data (see step S203 and step S204). The fifth drive operation is an example of the first coarse adjustment operation.

When it is determined that the reference pixel data is white data after the fifth drive operation or the seventh drive operation is performed, the unit drive device 17 executes the sixth drive operation (see step S204 and step S205). The sixth drive operation is an example of the second coarse adjustment operation.

When it is determined that the reference pixel data is black data after the sixth drive operation in step S205 or the seventh drive operation in step S207 is performed, the unit drive device 17 executes the processes of step S303 and step S304 (see FIG. 11).

In step S303 and step S304, the unit drive device 17 executes the third drive operation one or more times until it is determined that the reference pixel data is white data. The third drive operation is an example of the fine adjustment operation.

When it is determined that the reference pixel data is white data after the third drive operation is performed, the unit drive device 17 executes the completion drive operation (see step S304 and step S305). By executing the completion drive operation, the scanning unit 10 is positioned at the home position P1.

In the present embodiment, the fourth drive operation in step S201 and the seventh drive operation in step S207 constitute the long-distance adjustment operation group.

In the present embodiment, the fifth drive operation in step S203, the sixth drive operation in step S205, and the completion drive operation in step S305 constitute the middle-distance adjustment operation group.

The reading control portion 5*b* outputs the first pattern signal SP1 as the speed command signal when causing the unit drive device 17 to execute any operation of the long-distance adjustment operation group (see FIG. 13).

The reading control portion 5*b* outputs the second pattern signal SP2 as the speed command signal when causing the unit drive device 17 to execute any operation of the middle-distance adjustment operation group (see FIG. 13).

On the other hand, the reading control portion 5*b* outputs the third pattern signal SP3 as the speed command signal when causing the unit drive device 17 to execute the third drive operation in step S303 (see FIG. 13).

Even when the image reading apparatus 1A is employed, the same effect as that when the image reading apparatus 1 is employed can be obtained.

First Application Example

A first application example of the image reading apparatus 1 or the image reading apparatus 1A will be described below with reference to FIG. 12.

Figure 12:
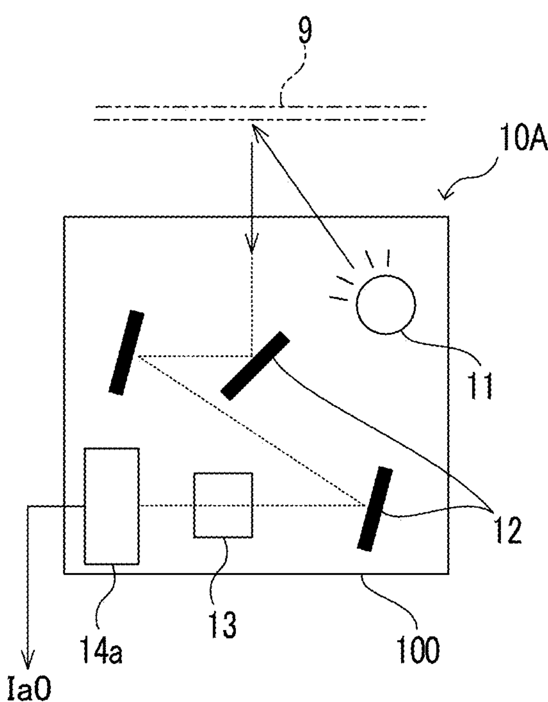
FIG. 12 is a configuration diagram of a scanning unit according to an application example in the image reading apparatus according to the first embodiment or the second embodiment.

The image reading apparatus according to the first application example has a configuration in which the scanning unit 10 of the image reading apparatus 1 or the image reading apparatus 1A is replaced with a scanning unit 10A shown in FIG. 12.

The scanning unit 10A includes a light emitting portion 11, one or more mirrors 12, a lens 13, an image sensor 14*a*, and a carriage 100. The carriage 100 supports the light emitting portion 11, the mirror 12, the lens 13, and the image sensor 14*a*.

The mirror 12 and the lens 13 are examples of the light guiding member that guides the reflected light to the image sensor 14*a*. The image sensor 14*a* is a charge coupled device (CCD) type line sensor.

Like the image sensor 14, the image sensor 14*a* receives light guided by the light guiding member and outputs a line image signal Ia0 representing the amount of received light. Even when the present application example is employed, the same effect as that when the image reading apparatus 1 or the image reading apparatus 1A is employed can be obtained.

Second Application Example

Next, a second application example of the image reading apparatus 1 or the image reading apparatus 1A will be described. The present application example is an application example of the first application example.

In the present application example, the carriage 100 is divided into a first carriage and a second carriage having different moving speeds. The first carriage supports the light emitting portion 11 and some of the plurality of mirrors 12, and the second carriage supports the rest of the plurality of mirrors 12.

In addition, the lens 13 and the image sensor 14*a* are fixed in the main body 101.

The mirrors 12 supported by the first carriage guide the light reflected by the document sheet 9 to the mirrors 12 supported by the second carriage, and the mirrors 12 supported by the second carriage guide the light to the lens 13 and the image sensor 14*a* fixed in the main body 101. Even when the present application example is employed, the same effect as that when the first application example is employed can be obtained.

Third Application Example

Next, a third application example of the image reading apparatus 1 will be described.

In the present application example, the colors of the lower surfaces of the first reference portion 23*a*, the second reference portion 23*b*, the third reference portion 23*c*, and the fourth reference portion 23*d* are switched between black and white as compared with the image reading apparatus 1. That is, in the present application example, the first color is white and the second color is black.

In the present application example, the reading control portion 5*b* executes the processes shown in FIG. 7 and FIG. 8 by switching between black and white. Even when the present application example is employed, the same effect as that when the image reading apparatus 1 is employed can be obtained.

Fourth Application Example

Next, a fourth application example of the image reading apparatus 1 will be described.

In the present application example, the first white reference portion 21 and the second reference portion 23*b* are arranged opposite to the arrangement of the first white reference portion 21 and the second reference portion 23*b* in the image reading apparatus 1.

In the present application example, the second white reference portion 22 includes the second reference portion 23*b*. That is, in the present application example, one end of the second white reference portion 22 in the main scanning direction D1 is the second reference portion 23*b*.

In the present application example, the first white reference portion 21 includes the fourth reference portion 23*d*. That is, in the present application example, one end of the first white reference portion 21 in the main scanning direction D1 is the fourth reference portion 23*d*.

Even when the present application example is employed, the same effect as that when the image reading apparatus 1 is employed can be obtained.

Fifth Application Example

Next, a fifth application example of the image reading apparatus 1A will be described.

In the present application example, the colors of the lower surfaces of the first reference portion 23*a*, the second reference portion 23*b*, and the third reference portion 23*c* are switched between black and white as compared with the image reading apparatus 1A. That is, in the present application example, the first color is white and the second color is black.

In the present application example, the reading control portion 5*b* executes the processes shown in FIG. 11 and FIG. 8 by switching between black and white. Even when the present application example is employed, the same effect as that when the image reading apparatus 1A is employed can be obtained.

APPENDIXES TO DISCLOSURE

The following are appendixes to the overview of the disclosure extracted from the above embodiments. It is noted that the structures and processing functions to be described in the following appendixes can be selected and combined arbitrarily.

Appendix 1

An image reading apparatus comprising:

a transparent plate-shaped platen plate portion on which a document sheet is placed;

a scanning unit including a light emitting portion and a light guiding portion each disposed along a main scanning direction that intersects a first direction, the scanning unit being movable in the first direction and a second direction opposite to the first direction in a movable area including an area below the platen plate portion;

a main image sensor configured to receive light guided by the light guiding portion and output a line image signal representing an amount of received light;

a control device configured to output a direction command signal indicating a moving direction of the scanning unit and a speed command signal indicating a moving speed of the scanning unit;

a unit drive device configured to move the scanning unit in the movable area in a direction according to the direction command signal at a speed according to the speed command signal;

a data processing portion configured to process line image data including a plurality of pixel data corresponding to the line image signal output by the main image sensor;

a first reference portion disposed along a side edge forming one end of the platen plate portion in the main scanning direction and having a lower surface of a first color; and a second reference portion disposed adjacent to the first reference portion in the first direction and having a lower surface of a second color different from the first color, wherein the data processing portion executes a color determination process of determining whether one or more reference pixel data of a reference area corresponding to the first reference portion or the second reference portion in the line image data is data of the first color or the second color, the control device positions the scanning unit at a home position on the first direction side with respect to the platen plate portion by sequentially selecting a plurality of drive operations from a plurality of trial drive operations each having a different direction or distance for moving the scanning unit and causing the unit drive device to execute the plurality of drive operations, and when causing the unit drive device to execute the plurality of drive operations, the control device outputs, to the unit drive device, the speed command signal of a different level depending on a moving distance of the scanning unit.

Appendix 2

The image reading apparatus according to Appendix 1, wherein, when the moving distance of the scanning unit is longer than a predetermined reference distance, the control device outputs, as the speed command signal, a signal whose signal level gradually increases from a zero level to a set level determined in accordance with the moving distance of the scanning unit and then gradually decreases to the zero level, and when the moving distance of the scanning unit is the reference distance, the control device outputs, as the speed command signal, a rectangular wave signal whose signal level rises sharply from the zero level to a reference level smaller than the set level and then falls sharply to the zero level.

Appendix 3

The image reading apparatus according to Appendix 2, wherein the plurality of trial drive operations include:

one or more pre-adjustment operations in which the unit drive device moves the scanning unit in the first direction or the second direction by a pre-adjustment distance determined in accordance with a determination result of the color determination process;

one or more fine adjustment operations in which, when it is determined that the reference pixel data is the data of the first color after the pre-adjustment operation is performed, the unit drive device moves the scanning unit in the first direction by the reference distance which is shorter than the pre-adjustment distance until it is determined that the reference pixel data is the data of the second color; and a completion drive operation in which, when it is determined that the reference pixel data is the data of the second color after the fine adjustment operation is performed, the unit drive device positions the scanning unit at the home position by moving the scanning unit in the first direction by a final adjustment distance, wherein the control device outputs the first pattern signal as the speed command signal when causing the unit drive device to execute the pre-adjustment operation or the completion drive operation, and outputs the second pattern signal as the speed command signal when causing the unit drive device to execute the fine adjustment operation.

Appendix 4

The image reading apparatus according to any one of Appendix 1 to Appendix 3, further comprising:

a white reference portion disposed along the main scanning direction on the first direction side with respect to the platen plate portion and having a white lower surface, wherein the second color is white, and the white reference portion includes the second reference portion.

Appendix 5

The image reading apparatus according to any one of Appendix 1 to Appendix 3, further comprising:

a transparent plate-shaped contact plate portion disposed on the first direction side with respect to the platen plate portion;

a document conveying device configured to convey the document sheet along a conveying path through an upper surface of the contact plate portion;

a third reference portion disposed adjacent to the second reference portion in the first direction and having a lower surface of the first color; and a fourth reference portion disposed adjacent to the third reference portion in the first direction and having a lower surface of the second color, wherein the home position is a position between the platen plate portion and the contact plate portion.

Appendix 6

The image reading apparatus according to Appendix 5, further comprising:

a first white reference portion disposed along the main scanning direction in an area between the platen plate portion and the contact plate portion in a sub-scanning direction along the first direction and the second direction, and having a white lower surface;

a second white reference portion disposed along the main scanning direction in the area between the platen plate portion and the contact plate portion in the sub-scanning direction, and having a white upper surface; and a sub-image sensor disposed to face the upper surface of the second white reference portion and configured to read an image of an upper surface of the document sheet conveyed by the document sheet conveying device, wherein the second color is white, one of the first white reference portion and the second white reference portion includes the second reference portion, and another one of the first white reference portion and the second white reference portion includes the fourth reference portion.

Appendix 7

The image reading apparatus according to any one of Appendix 1 to Appendix 6, further comprising:

an end reference portion disposed adjacent to the first reference portion in the second direction in an area of an end of the movable area in the second direction and having a lower surface of a third color different from the first color and the second color, wherein the data processing portion determines whether the reference pixel data is data of the first color, the second color, or the third color in the color determination process.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading apparatus comprising:

a transparent plate-shaped platen plate portion on which a document sheet is placed;

a scanning unit including a light emitting portion and a light guiding portion each disposed along a main scanning direction that intersects a first direction, the scanning unit being movable in the first direction and a second direction opposite to the first direction in a movable area including an area below the platen plate portion;

a main image sensor configured to receive light guided by the light guiding portion and output a line image signal representing an amount of received light;

a control device configured to output a direction command signal indicating a moving direction of the scanning unit and a speed command signal indicating a moving speed of the scanning unit;

a unit drive device configured to move the scanning unit in the movable area in a direction according to the direction command signal at a speed according to the speed command signal;

a data processing portion configured to process line image data including a plurality of pixel data corresponding to the line image signal output by the main image sensor;

a first reference portion disposed along a side edge forming one end of the platen plate portion in the main scanning direction and having a lower surface of a first color; and a second reference portion disposed adjacent to the first reference portion in the first direction and having a lower surface of a second color different from the first color, wherein the data processing portion executes a color determination process of determining whether one or more reference pixel data of a reference area corresponding to the first reference portion or the second reference portion in the line image data is data of the first color or the second color, the control device positions the scanning unit at a home position on the first direction side with respect to the platen plate portion by sequentially selecting a plurality of drive operations from a plurality of trial drive operations each having a different direction or distance for moving the scanning unit and causing the unit drive device to execute the plurality of drive operations, and when causing the unit drive device to execute the plurality of drive operations, the control device outputs, to the unit drive device, the speed command signal of a different level depending on a moving distance of the scanning unit.

2. The image reading apparatus according to claim 1, wherein, when the moving distance of the scanning unit is longer than a predetermined reference distance, the control device outputs, as the speed command signal, a trapezoidal wave signal whose signal level gradually increases from a zero level to a set level determined in accordance with the moving distance of the scanning unit and then gradually decreases to the zero level, and when the moving distance of the scanning unit is the reference distance, the control device outputs, as the speed command signal, a rectangular wave signal whose signal level rises sharply from the zero level to a reference level smaller than the set level and then falls sharply to the zero level.

3. The image reading apparatus according to claim 2, wherein the plurality of trial drive operations include:

one or more pre-adjustment operations in which the unit drive device moves the scanning unit in the first direction or the second direction by a pre-adjustment distance determined in accordance with a determination result of the color determination process;

one or more fine adjustment operations in which, when it is determined that the reference pixel data is the data of the first color after the pre-adjustment operation is performed, the unit drive device moves the scanning unit in the first direction by the reference distance which is shorter than the pre-adjustment distance until it is determined that the reference pixel data is the data of the second color; and a completion drive operation in which, when it is determined that the reference pixel data is the data of the second color after the fine adjustment operation is performed, the unit drive device positions the scanning unit at the home position by moving the scanning unit in the first direction by a final adjustment distance, wherein the control device outputs the trapezoidal wave signal as the speed command signal when causing the unit drive device to execute the pre-adjustment operation or the completion drive operation, and outputs the rectangular wave signal as the speed command signal when causing the unit drive device to execute the fine adjustment operation.

4. The image reading apparatus according to claim 1, further comprising:

a white reference portion disposed along the main scanning direction on the first direction side with respect to the platen plate portion and having a white lower surface, wherein the second color is white, and the white reference portion includes the second reference portion.

5. The image reading apparatus according to claim 1, further comprising:

a transparent plate-shaped contact plate portion disposed on the first direction side with respect to the platen plate portion;

a document conveying device configured to convey the document sheet along a conveying path through an upper surface of the contact plate portion;

a third reference portion disposed adjacent to the second reference portion in the first direction and having a lower surface of the first color; and a fourth reference portion disposed adjacent to the third reference portion in the first direction and having a lower surface of the second color, wherein the home position is a position between the platen plate portion and the contact plate portion.

6. The image reading apparatus according to claim 5, further comprising:

a first white reference portion disposed along the main scanning direction in an area between the platen plate portion and the contact plate portion in a sub-scanning direction along the first direction and the second direction, and having a white lower surface;

a second white reference portion disposed along the main scanning direction in the area between the platen plate portion and the contact plate portion in the sub-scanning direction, and having a white upper surface; and a sub-image sensor disposed to face the upper surface of the second white reference portion and configured to read an image of an upper surface of the document sheet conveyed by the document sheet conveying device, wherein the second color is white, one of the first white reference portion and the second white reference portion includes the second reference portion, and another one of the first white reference portion and the second white reference portion includes the fourth reference portion.

7. The image reading apparatus according to claim 1, further comprising:

an end reference portion disposed adjacent to the first reference portion in the second direction in an area of an end of the movable area in the second direction and having a lower surface of a third color different from the first color and the second color, wherein the data processing portion determines whether the reference pixel data is data of the first color, the second color, or the third color in the color determination process.

* * * * *